United States Patent [19]

Gordon et al.

[11] Patent Number: 4,942,599
[45] Date of Patent: Jul. 17, 1990

[54] LOCATION IDENTIFICATION

[75] Inventors: Alastair T. Gordon; Michael H. Reichmann, both of Toronto, Canada

[73] Assignee: Alphanet Technology Corporation, Toronto, Canada

[21] Appl. No.: 305,445

[22] Filed: Feb. 2, 1989

[51] Int. Cl.$^5$ .................... H04M 11/00; H04M 3/42
[52] U.S. Cl. ..................................... 379/93; 379/97; 379/100; 379/207; 379/246; 358/407; 358/440
[58] Field of Search ............... 379/93, 96-98, 379/100, 207, 201, 112, 127, 245-247; 358/402, 407, 440

[56] References Cited

U.S. PATENT DOCUMENTS

| 4,649,563 | 3/1987 | Riskin | 379/97 |
| 4,757,267 | 7/1988 | Riskin | 379/201 |

FOREIGN PATENT DOCUMENTS 2165420 4/1986 United Kingdom ............ 379/201

OTHER PUBLICATIONS

G. A. Raack et al., "Customer Control of Network Services", *IEEE Communications Magazine*, Oct. 1984, vol. 22, No. 10, pp. 8-14.

Primary Examiner—Jin F. Ng
Assistant Examiner—Wing F. Chan

[57] ABSTRACT

An improved data transmission system which transmits data at least partially over existing telephone lines, the improvement comprising devices which, in addition to transmitting and receiving data and being actuated by a non-telephone signal, automatically complete a telephone communication with a predetermined computer. Once the device is connected to the computer, it receives information such as a particular telephone number which is used in the reception and/or transmission of data. The received information is preferably peculiar to the location of the device and can be used to appropriately program the device for carrying out a function in a manner specific to its location. The information specific to the location is determined in accordance with the telephone number of the telephone line connecting the device to the telephone system as the computer has the capability of Calling Number Identification.

18 Claims, 2 Drawing Sheets

LOCATION IDENTIFICATION

FIELD OF THE INVENTION

The invention relates to data transmitting arrangements, methods and devices where data is transmitted at least partially via telephone communications.

BACKGROUND OF THE INVENTION

A particular system for transmission of data or information between a first party and a second party is taught in U.S. Pat. 4,713,837 wherein certain advantages are realized by processing the transmission through an intermediary. In particular, it is desirable to use this type of arrangement in combination with data transmitting/receiving devices which are designed for transmission of the information over a telephone network. The process intermediary is not dedicated to traditional telephone transmission circuits and in a preferred form, advantageously transmits the data to an associated process intermediary over dedicated data transmission systems (see copending application Ser. No. 137,799 filed Dec. 24, 1987 incorporated herein by reference). The process intermediary includes a separate non-telephone actuation means for signalling a data transmitting/receiving device for which a message has been received such that the device can then, through the telephone capability, initiate a telephone communication with the process intermediary. Such an arrangement does not require the transmitting/receiving device to have a dedicated telephone line, as the actuation of the device for receiving transmissions is controlled by the process intermediary.

In related U.S. application Ser. No. 137,799 filed Dec. 24, 1987, an actuation and routing device attaches to or forms part of a data transmitting/receiving device, such as a facsimile machine. This device routes outgoing transmissions in one manner for certain local calls and routes at least certain long distance transmissions in a different manner, and routes certain special instructions entered via the dialing keypad of the originating transmitting/receiving device to the process intermediary for processing and/or for the subsequent delivery of information back to the originating data transmitting/receiving device. In the case of local transmissions, the data transmitting/receiving device generally operates in the normal manner, whereas in the case of certain long distance transmissions they are routed to a process intermediary for transmission in a more efficient manner at least partially over a digital data network. The device also serves to receive a non-telephone actuation signal indicating a transmission has been received by the process intermediary for the particular data transmitting/receiving device. The actuation and routing device then initiates a telephone communication between the data transmitting/receiving device and the process intermediary for delivery of the information over the telephone circuit thus established.

In these systems, it is desirable to have the actuation and routing device capable of determining or automatically receiving the telephone number which it must call to redirect long distance and other calls or for information requests, or the telephone number of the process intermediary used when a message is to be retrieved from the process intermediary. As can be appreciated, it would be highly desirable if the actuation and routing device could be standardized such that the installer need not preprogram the telephone number, based on the location of the actuation and routing device, and, in the case that the device was moved, it would automatically determine the appropriate number for the transmission and/or reception of messages or other services.

The actuation and routing device can be separated into two functions, however, it is preferred to combine the functions into one unit.

SUMMARY OF THE INVENTION

A method for transmitting information to a programmable data transmitting/receiving device having associated therewith a telephone capability connected to a telephone line is proposed wherein the information is particular to the location of the telephone line.

The method, according to the invention, for transmitting information to a programmable data processing device having associated therewith a telephone capability connected to a telephone line comprises:

using the telephone capability to automatically complete a telephone communication via the telephone line with a predetermined computer at a predetermined telephone number, receiving at the predetermined computer the Calling Number Identification of the telephone line to which the programmable data processing device is connected, determining from the Calling Number Identification, information specific to the general location of the telephone line known from the Calling Number Identification, transmitting the determined information specific to the general location of the telephone line to the data processing device, and using the determined information to program the programmable data processing device.

In a preferred form of the invention, the method comprises using the telephone capability to automatically complete a telephone communication with a predetermined computer at a predetermined number, receiving at the predetermined computer the Calling Number Identification of the telephone line to which the programmable data transmitting/receiving device is connected, determining from the Calling Number Identification an appropriate telephone number to be used by the data transmitting/receiving device in the transmission and/or reception of data, transmitting the determined appropriate number to the data transmitting/receiving device, and recording the determined appropriate number in a manner for use by the data transmitting/receiving device.

This particular method allows the programmable data transmitting/receiving device to automatically place a call to a predetermined number which is constant for all the units or could be constant for all the units. Provided at this number is the capability to identify the telephone number of the telephone line connecting the device to the telephone system and using that information to forward information specific to the general location of the telephone line that is used by the device to program the same.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
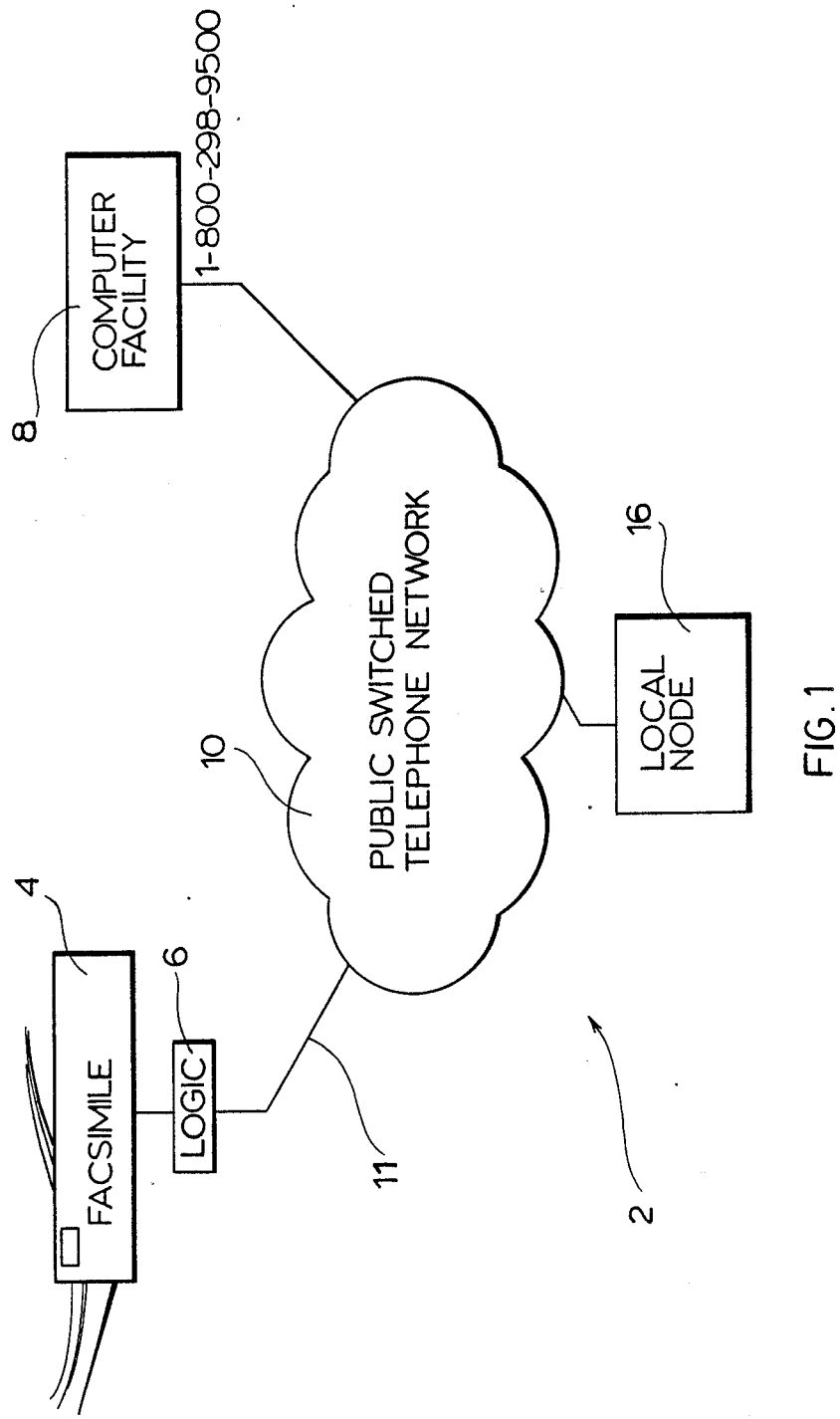
FIG. 1 is a partial schematic view illustrating the invention.
Figure 2:
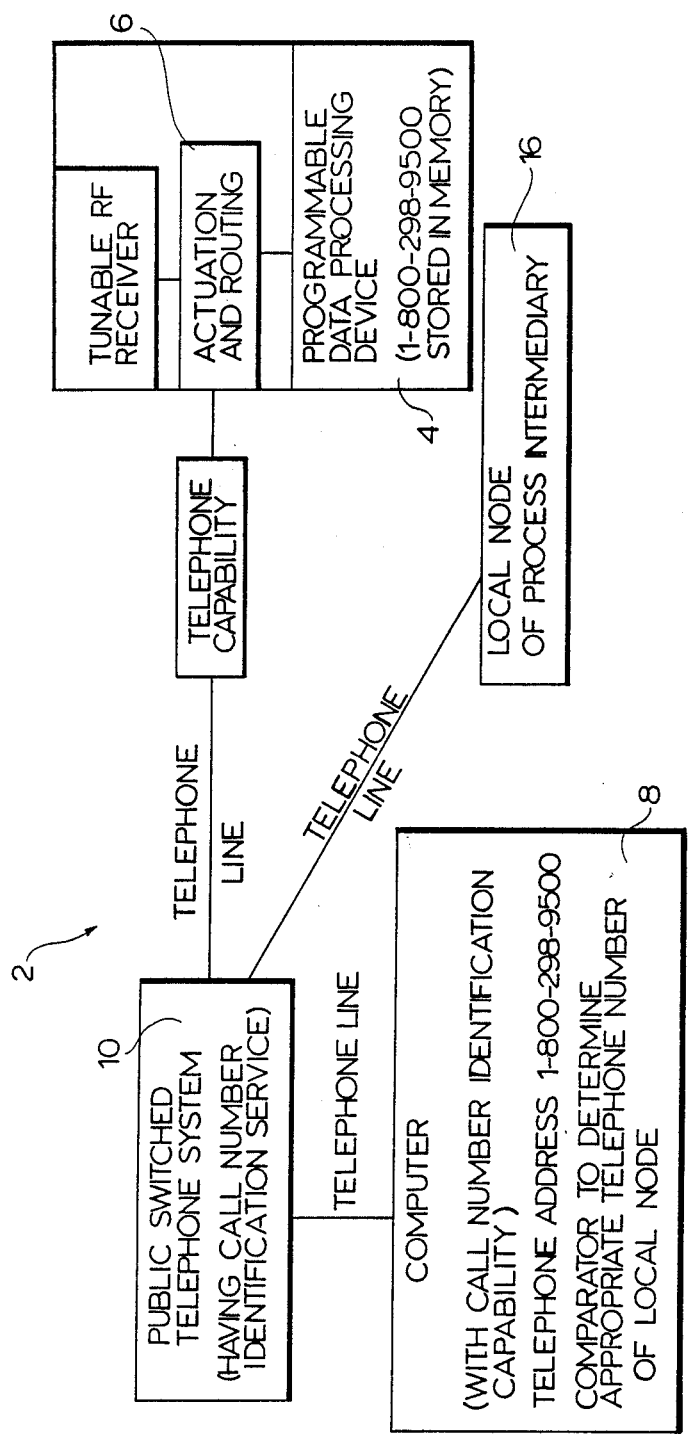
FIG. 2 is a schematic view illustrating further details of the invention.

The data transmission arrangement 2 as shown in FIGS. 1 and 2 effectively utilizes the capabilities of the telephone system 10 to allow efficient data transmission.

The facsimile machine 4, which is representative of any data transmitting/receiving device connectable to a telephone system, can effectively transmit and/or receive data according to a known protocol. Associated with the facsimile machine 4 is an actuation and routing device 6 which directs outgoing transmissions in a particular manner. Within the actuation and routing device is computer logic to automatically complete a telephone communication with a predetermined computer 8 at particular times or events. The predetermined computer preferably has a common telephone number for a large distribution region, such as a state, province, or country. In this way, the computer logic associated with the actuation and routing device 6, which can be separate or integral with the facsimile machine 4, preferably has within that logic the particular telephone number, preferably a 1-800 telephone number, of the predetermined computer 8. The actuation and routing device 6 monitors the non-telephone actuation signals and appropriately initiates the telephone communication between the process intermediary and the data transmitting/receiving device when a transmission has been received by the process intermediary destined for the particular data transmitting/receiving device.

The computer logic associated with the actuation and routing device 6, upon being connected to the public switched telephone network 10 via a telephone line 11, recognizes that it requires a telephone transmission and/or reception number for the transmission and/or reception of data, and places a call to the predetermined computer 8 via the public switched telephone network 10 using the particular telephone number of the predetermined computer 8. The predetermined computer 8 has the capability to read the Calling Number Identification of the telephone line 11 connecting the actuation and routing device 6 to the public switched telephone network and from this identified telephone number, the computer 8 determines the appropriate telephone transmission and/or reception number or numbers for that particular location of the data transmitting/receiving device. The appropriate telephone transmission and/or reception number is used by the facsimile machine 4 in the reception and/or transmission of data or transmission of a request for services.

Calling Number Identification is now being made available by the telephone companies and essentially allows receiving parties to receive the telephone number from which a call is originating. This telephone number allows the computer 8 to determine location information of the telephone line whereby the telephone number of the appropriate local node of the process intermediary can be selected.

If one considers the data transmission system or arrangement as taught in U.S. Pat. 4,713,837 incorporated herein by reference, it is recognized that the process intermediary actuates the data transmitting/receiving device by producing a non-telephone actuation signal which allows the data transmitting/receiving device to recognize that a data transmission destined for the data transmitting/receiving device has been received by the process intermediary. The actuation and routing device associated with the data transmitting/receiving device then recalls, from memory, the telephone number of the appropriate local node of the process intermediary.

In the case of a nationwide system, the process intermediary will be divided into local area nodes whereby the call from the data transmitting/receiving device to the local node will be a local call or at least a very low cost long distance call. However, a problem results in that the actuation and routing device must know the telephone transmission number to call and it is extremely difficult to have a single local telephone number dedicated for all regions of the country. However, with the capability as described above, the predetermined computer 8 can recognize the location from which the call originates (i.e. by considering the Calling Number Identification) and compare the Calling Number Identification with other data to determine the appropriate local node and thereafter provide to the actuation and routing device 6 the telephone transmission and/or reception number to be used in the transmission and/or reception of data at the general location of the telephone line 11 to which the data transmitting/receiving device 4 is connected.

In this arrangement, all of the data transmitting/receiving devices with the associated actuation and routing device 6 preferably will have the same toll free 1-800 telephone number and, regardless of where the device is used within the system, it will automatically place the call to the predetermined computer 8 and then have assigned to it the appropriate telephone transmission and/or reception number of the closest local area node 16. This greatly simplifies the distribution of the product and, in fact, simplifies the installation. A user may merely pick up the device and install it at his place of business and it will automatically, correctly identify the appropriate local node for use in the transmission and/or reception of information.

Information other than the telephone transmission and/or reception number of the local area node can be forwarded to a programmable data transmitting/receiving device using the method of the invention. Such information is preferably specific to the location of the telephone line which connects the programmable data transmitting/receiving device to the public switched telephone network. For example, other telephone transmission numbers could be provided for specific services such as stock alerts, weather forecasts, and airline information services. Other information such as testing frequencies for data recording devices could be provided to test equipment upon sensing a given condition locally with the frequency of subsequent recordings determined by the predetermined computer possibly based on local conditions known to the computer.

In the actuation and routing device 6, this method can also be used to adjust other internal parameters of the device to suit local conditions, such as tuning the RF receiver in the device to particular local RF frequencies used to actuate such devices in that area.

The device and method has been described with respect to the telephone number of the predetermined computer being available within the device itself, however, other arrangements are possible. For example, the broadcast signal used by the process intermediary could include from time to time the number of the predetermined computer in a manner to be identified by the actuation and routing device. In this way, the device, once connected, would receive the number of the predetermined computer and thereafter carry out the process in the manner previously described.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A method for transmitting information to programmable data processing devices by means of a telephone system having Call Number Identification Service, each programmable data processing device having associated therewith a telephone capability, connected to a telephone line; said method comprising with respect to each programmable data processing device:
   using said telephone capability of the programmable data processing device to automatically complete a telephone communication via said telephone line with a predetermined computer at a predetermined telephone number.
   receiving at the predetermined computer the Calling Number Identification of the telephone line to which the programmable data processing device is connected,
   determining at the predetermined computer by means of said Calling Number Identification, information specific to the general location of the telephone line derived from the Calling Number Identification,
   transmitting from the predetermined computer to the programmable data processing device the determined information specific to the general location of the telephone line to the data processing device, and
   using the determined information within the programmable data processing device to program the programmable data processing device.

2. A method for transmitting information as claimed in claim 1, wherein said step of determining from the Calling Number Identification includes comparing the Calling Number Identification with a bank of telephone numbers to determine the appropriate telephone number of a process intermediary which is selectively used by the programmable data processing device.

3. A method as claimed in claim 1, wherein said step of automatically using said telephone capability is carried out at predetermined time periods or events.

4. A method as claimed in claim 3, wherein said predetermined events include connection of said data transmitting/receiving device to said telephone line.

5. A method as claimed in claim 1, wherein said predetermined telephone number of said predetermined computer is a toll free long distance number.

6. In a data transmission system which includes individual programmable devices which transmit data therebetween via a process intermediary over telephone lines of a telephone system, the improvement comprising a computer connected to the telephone system and having Calling Number Identification capability, said computer when activated by a calling programmable device receives the Calling Number Identification of a telephone line connecting the calling programmable device to the telephone system and thereafter process the Calling Number Identification to determine certain required information specific to the general location of the telephone line and then transmits over the telephone line the required information to said programmable device, said calling programmable device receiving said required information and using the same in programming thereof to program the device in a manner specific to the general location of the telephone line connecting said programmable device to the telephone system.

7. In a data transmission system as claimed in claim 6, wherein each of said individual programmable devices includes an actuation and routing means, said actuation and routing means including means for retaining in memory a telephone number to be used in routing certain transmissions to a predetermined process intermediary and a tunable RF receiver for receiving an RF actuation signal when a transmission is to be received by the associated programmable device, and wherein the information specific to the location of the telephone line is used by the programmable device to appropriately tune the RF receiver to a particular local RF actuation frequency and to store in memory the telephone number used in routing certain transmissions.

8. In a data transmitting system comprising a predetermined computer having a predetermined telephone number and Calling Number Identification capability, and a plurality programmable data transmitting/receiving arrangements each of which transmits data by means of a telephone system, each programmable data transmitting/receiving arrangement comprising means for automatically completing a telephone communication with said predetermined computer by automatically dialing said predetermined telephone number of the predetermined computer stored in said programmable data transmitting/receiving arrangement, said predetermined computer upon completing of a telephone communication with one of said programmable data transmitting/receiving arrangements determining the Calling Number Identification of a telephone line connecting said programmable data transmitting/receiving arrangement to the telephone system, and thereafter the programmable data transmitting/receiving arrangement receives from the predetermined computer and stores information specific to the general location of the telephone line connecting the same to the telephone system used to program the transmitting/receiving arrangement in carrying out certain functions specific to the general location of the transmitting/receiving arrangement which information has been determined by the predetermined computer based on the received Calling Number Identification.

9. In a data transmitting system as claimed in claim 8, wherein said predetermined telephone number is a long distance toll free number.

10. A method for transmitting information to a data transmitting/receiving arrangement, having associated therewith a telephone capability, connected to a telephone line of a telephone system wherein the information is particular to the location of the telephone line connected to the data transmitting/receiving arrangement, said method comprising:
   using said telephone capability of the data transmitting/receiving arrangement to automatically complete at a predetermined telephone number,
   receiving at the predetermined computer the Calling Number Identification of the telephone line to which the data transmitting/receiving arrangement is connected,
   determining from said Calling Number Identification an appropriate telephone number to be used by the data transmitting/receiving arrangement in the transmission and/or reception of data a the general location of the telephone line to which the data transmitting/receiving arrangement is connected, transmitting the determined appropriate telephone number to the data transmitting/receiving arrangement, and recording the determined appropriate number in a manner for use by the data transmitting/receiving arrangement.

11. A method for transmitting information as claimed in claim 10, wherein said step of determining from the Calling Number Identification includes comparing the Calling Number Identification with a bank of numbers to determine the appropriate telephone number of a process intermediary connected to the telephone system and through which the data transmitting/receiving arrangement communicates data.

12. A method as claimed in claim 10, wherein said step of automatically using said telephone capability is carried out at predetermined time periods or events.

13. A method as claimed in claim 12, wherein said predetermined events include connection of said data transmitting/receiving arrangement to said telephone line.

14. A method as claimed in claim 10, wherein said predetermined number of said predetermined computer is a toll free long distance telephone number.

15. In a data transmission system which includes individual programmable devices each connected to a telephone system by a telephone line identified by a telephone number, wherein said devices transmit data therebetween via a process intermediary over telephone lines, the improvement comprising a computer which has Calling Number Identification capability and when appropriately activated by an incoming telephone call, recognizes the Calling Number Identification of a telephone line connecting the calling device with the telephone system and providing said calling used in the transmitting and/or receiving of information appropriate to the general location of the telephone line connecting the device to the telephone system.

16. In a programmable data transmitting/receiving device having a telephone capability connected to a telephone line by means of which data is transmitted to a telephone system, the improvement comprising the programmable data transmitting/receiving device carrying out the steps of automatically completing a telephone communication with a predetermined computer by automatically dialing a predetermined telephone number of the predetermined computer which receives the Calling Number Identification of the telephone line connecting said transmitting/receiving device with the telephone system, and thereafter the data transmitting/receiving device receives and stores information including a particular telephone number to be used in the receiving and/or transmitting of data, said particular telephone number being associated with the particular location of the telephone line used by the data transmitting device.

17. In a data transmitting/receiving device as claimed in claim 16, wherein said steps of automatically completing a telephone communication includes retrieving the predetermined telephone number of the predetermined computer from non-volatile memory of the programmable data transmitting/receiving device.

18. In a date transmitting/receiving device as claimed in claim 17, wherein said predetermined telephone number is a long distance toll free telephone number.

* * * * *